Patented Nov. 16, 1926.

1,607,562

UNITED STATES PATENT OFFICE.

HENRY SAMUEL POTTER, OF JOHANNESBURG, SOUTH AFRICA, ASSIGNOR OF ONE-HALF TO THE M-L MAGNETO SYNDICATE, LIMITED, OF COVENTRY, ENGLAND, A BRITISH COMPANY.

SAFETY LAMP.

Application filed April 26, 1923, Serial No. 634,918, and in Great Britain May 10, 1922.

The object of this invention is to provide a compact, relatively light, and efficient electric lighting set particularly suitable for giving highly effective illumination with the maximum safety in the underground workings of mines, inside boilers, tanks, double-bottoms of ships and other places, the apparatus according to this invention being such that it can be used with safety in dangerous gaseous mines.

The invention consists principally in the combination, within a suitable casing, of a small turbine wheel or the like and a magneto-electric generator. The rotor of both turbine and generator are together mounted on a shaft rotatable in suitable bearings within the casing. The turbine is driven by compressed air delivered thereto through a supply duct furnished with an air cock and suitably connected with the casing and with a source of compressed air supply. In the case of collieries and other mines the compressed air for actuating the turbine may be taken from the compressed air pipe lines or mains usually provided for supplying compressed air for the operation of coal cutters, drills and other appliances within the mine workings. To the live or supply terminals of the magneto generator the terminals of a suitable electric lamp or lamps may be connected in the usual or any convenient manner.

Fig. 1 of the accompanying illustrative drawings shows in sectional elevation one embodiment of the invention by way of example.

Figure 1:
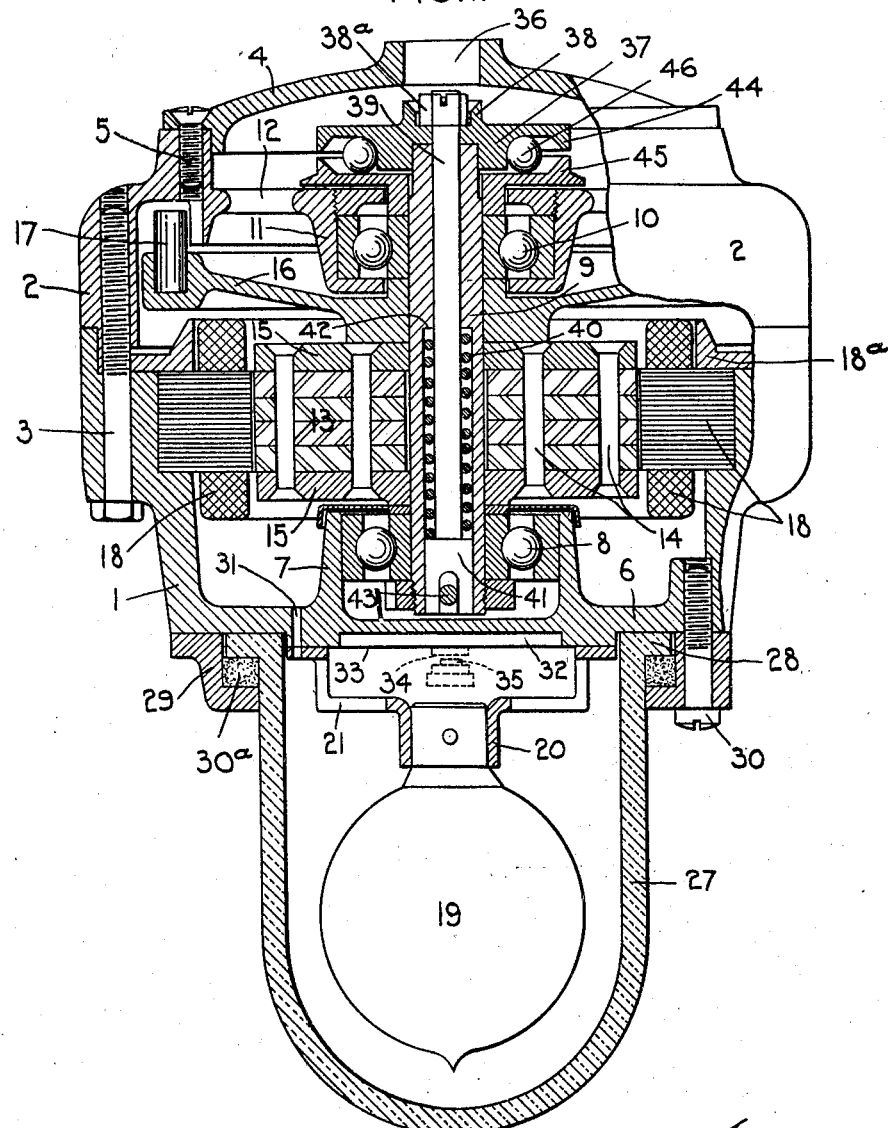
Figure 2:
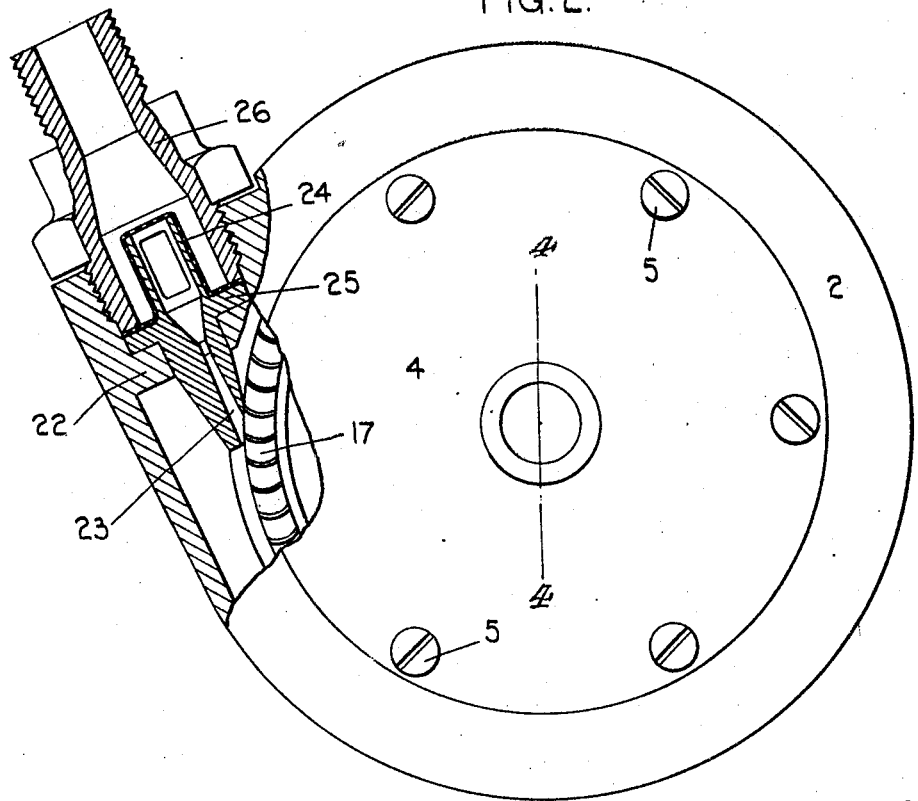
Fig. 2 shows the same partly in plan and partly in horizontal section.

The apparatus illustrated comprises a cylindrical casing constructed in two parts 1 and 2 connected together by screws 3, and an end cover 4 fixed to the cylindrical part 2 by screws 5.

The end wall 6 of the part 1 of the casing is formed with an inwardly extending hollow boss 7 in which is housed the outer race of a ball bearing 8 the inner race of which is fixed on one end of a centrally arranged hollow shaft 9. The other end of the shaft 9 has on it the inner race of a similar ball bearing 10 the outer race of which is secured in a hollow boss 11 supported by spider arms 12 of the casing part 2.

Fixed on the shaft 9, adjacent to the ball bearing 8 is a permanent magnet rotor 13 having a suitable number of poles and formed of laminations of cobalt steel gripped by rivets 14 or otherwise secured between end plates 15. Also fixed on the shaft 9 adjacent to the ball bearing 10 and close to the revolving magnet 13 is a turbine wheel consisting of a disc 16 provided with a ring of turbine blades 17 that project from said disc towards the adjacent end of the casing.

Fixed in the casing part 1, by means of a clamping ring $18^a$ around the rotor 13, is a wound laminated stator 18 in which an electric current is generated by rotation of the magnets 13.

19 indicates the bulb of an ordinary filament lamp mounted in a holder 20 carried by a spider frame 21 fixed to the outer face of the end 6 of the casing. As will be understood the ends of the stator windings 18 are connected in any suitable way to the lamp terminals in the holder 20.

Tangentially projecting from the casing part 2 is a branch 22 in which is mounted a nozzle 23 through which compressed air is delivered on to the blades 17 of the turbine wheel. The inlet to the nozzle 23 is fitted with a gauze air straining cap 24 formed with a flange that is gripped between a flange 25 on the nozzle and the inner end of a union 26 to which a compressed air supply pipe can be connected.

The lamp 19 is enclosed in a glass cap or cover 27 having a flange 28 that is held by a clamping ring 29 and screws 30 in close contact with the end wall 6, a packing ring $30^a$ of appropriate material being interposed between the clamping ring 29 and the flange 28 of the cap or cover 27.

Spent air from the turbine passes out from the casing through an exhaust port 36. This port is of somewhat restricted area so that there results a slight plenum within the casing and by a hole 31 in the wall 6 this is communicated to the lamp chamber 27. The end wall 6 is formed with a recess 32 that is closed excepting for a hole $32^a$ communicating with the atmosphere, by a diaphragm 33 which carries a contact 34 adapted to bear against a fixed contact 35 unless the diaphragm is pressed inwardly by the air under pressure within the cap or cover 27.

Figure 4:
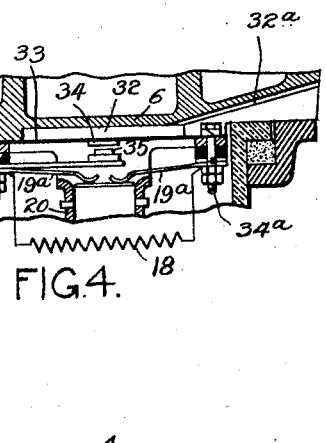
Fig. 4 is a cross-section, taken on the line 4—4 in Fig. 2, and showing a portion of the windings 18 diagrammatically.

As shown in Fig. 4, the contact 35 is electrically connected, through the arm that carries it, to a terminal 35ª which is carried by a ring 35ᵇ of insulating material. The insulated terminal 35ª is connected to one end of the winding 18 and is in electrical connection not only with the contact 35 but also with one of the contact fingers 19ª supplying current to the lamp 19. The other contact 34 is in electrical connection with the other end of the winding 18 and also with the other contact finger 19ª, supplying current to the lamp 19. The contacts 34 and 35 are so connected to the circuit of the windings 18 that the lamp is extinguished and the fixed windings are closed upon themselves when the circuit is completed at the said contacts, the arrangement being such that when the apparatus is working, pressure of air upon the diaphragm 33 maintains the contacts 34 and 35 open so that the lamp is operative but should the glass cap or cover 27 be accidentally broken the diaphragm 33 is no longer subjected to air pressure and it at once springs back and closes the contacts 34, 35 thereby extinguishing the lamp and closing the circuit of the fixed windings with the result that the revolving magnets 13 are quickly brought to rest by the retarding action of the currents induced in the windings.

The exhaust port 36 is formed in the end cover 4 and as will be seen this port is centrally located and the speed of rotation of the shaft 9 can be controlled by more or less throttling the said port. For this purpose a sliding disc-like member 37 is provided having a boss 38 adapted to enter the port and the said member is controlled by a centrifugal device.

In the example under notice the port controlling member 37 is carried on a rod 39 mounted to slide in the hollow shaft 9. A spring 40, arranged around the rod 39 between a head 41 thereof and a shoulder 42 formed in the hollow shaft 9, constantly tends to draw said rod and the member 37 mounted thereon inwardly, that is to say, away from the exhaust port 36. 43 is a pin passing through the shaft 9 and through a slot in the head 41 of the rod, to facilitate assembling when tightening the nut 38ª. The disc-like member 37 is recessed at its inner side and provided with a marginal flange 44 having an inclined inner face, the said flange being located opposite a similar flange 45 having a correspondingly inclined inner face, fixed on the shaft 9. Arranged within the annular chamber surrounded by the marginal flanges 44 and 45 are a number of balls 46 adapted to fly outwardly under centrifugal force and to then ride up the inclined faces of the marginal flanges so that the sliding member 37 will be caused to move towards the exhaust port 36 against the action of the spring 40 and to thereby more or less close or throttle the said port upon the speed of the shaft 9 exceeding that desired.

The magneto generator is preferably designed to supply alternating current at substantially constant voltage in spite of speed variations, and as shown is preferably of the inductor or of the revolving magnet type, having fixed windings. In these types there is neither commutator or slip-ring and consequently no risk whatever of a spark.

A feature of our invention tending to safety in a fiery mine is that it is possible altogether to eliminate the lamp-switch such as must be provided in all electric battery lamps. The spark on operating such a switch can be a source of danger. In the apparatus according to our invention a cock controlling the supply of compressed air serves in place of the switch and the electric circuit is never broken.

Figure 3:
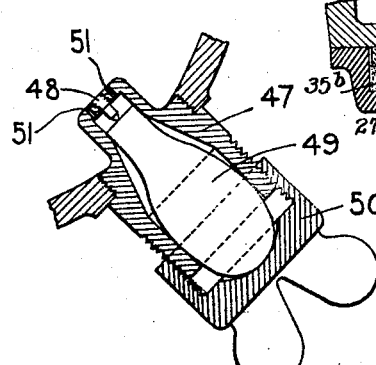
Fig. 3 is a detail view to which reference will be hereinafter made.

Carbonic acid gas or other suitable inert gas may be supplied to the magneto chamber and casing by means of an ordinary "sparklet" similar to those used for making aerated water; for this purpose, as shown in Fig. 3, a hollow socket 47 may be secured to that part of the casing in which the generator is situated, the inner end of the hollow socket preferably projecting within the casing and being fitted with the usual pin 48 for perforating the cap or stopper of the "sparklet" 49 which can be forced inwardly by means of a screw cap 50 on the outer end of the socket 47 in the inner end of which small holes or ports 51 are formed through which the gas released from the "sparklet" 49 can pass into the generator chamber in the casing. By this means if a mine worker or official has to go into a dangerous or gaseous zone in the mine he can, before proceeding into such zone, insert a "sparklet" in the chamber 47 and fill the magneto chamber in the casing with gas as above-mentioned as an insurance against danger from sparking.

Instead of the turbine wheel being fitted with projecting blades 17 as illustrated, any other suitable form of turbine may be employed.

What I claim is:

1. In an electric safety lamp, a casing having an air exhaust opening of predetermined area at one end, a stator secured in the casing, a translucent chamber for a lamp secured to the other end of the casing from the exhaust opening and communicating with the air space of the casing, an incandescent lamp secured in the lamp chamber and arranged in circuit with the stator, a rotor journaled in the casing, a turbine wheel secured to the rotor and arranged in the end portion of the casing next to the exhaust opening, said turbine wheel operating to revolve the rotor to operate the lamp and to maintain a predetermined pressure of air in the lamp chamber and in the said casing, and an automatic circuit controller inclosed in the lamp chamber and operating to stop the rotor when the lamp chamber is broken.

2. In an electric safety lamp, a casing having an exhaust opening of predetermined area, a magneto electric generator inclosed in the casing, a translucent lamp chamber secured to the casing in communication with its air space, an incandescent lamp inclosed in the lamp chamber and supplied with current by the said magneto, an air turbine wheel also inclosed in the casing and operating the magneto and maintaining a predetermined air pressure in the casing and lamp chamber, and an automatic circuit controller for the magneto inclosed in the lamp chamber and controlled by the air pressure therein and operating to stop the magneto automatically when the lamp chamber is broken and the air pressure released.

In testimony whereof I affix my signature.

HENRY SAMUEL POTTER.